United States Patent [19]
Oikawa

[11] Patent Number: 5,386,488
[45] Date of Patent: Jan. 31, 1995

[54] OPTICAL MODULE AND MANUFACTURING METHOD THEREFOR

[75] Inventor: Yoichi Oikawa, Kawasaki, Japan

[73] Assignee: Fujitsu Limited, Kanagawa, Japan

[21] Appl. No.: 146,102

[22] PCT Filed: Sep. 24, 1992

[86] PCT No.: PCT/JP92/01213
§ 371 Date: Nov. 16, 1993
§ 102(e) Date: Nov. 16, 1993

[87] PCT Pub. No.: WO93/20467
PCT Pub. Date: Oct. 14, 1993

[30] Foreign Application Priority Data
Apr. 2, 1992 [JP] Japan .................. 4-081121

[51] Int. Cl.[6] ........................... G02B 6/42
[52] U.S. Cl. ........................... 385/92; 385/94
[58] Field of Search .............. 385/88, 91, 92, 94

[56] References Cited
U.S. PATENT DOCUMENTS

| | | | |
|---|---|---|---|
| 4,285,572 | 8/1981 | Beaudette et al. | 385/92 |
| 4,549,783 | 10/1985 | Schmachtenberg, III | 385/92 |
| 4,865,410 | 9/1989 | Estrada et al. | 385/92 |
| 5,195,156 | 3/1993 | Freeman et al. | 385/92 |
| 5,289,555 | 2/1994 | Sanso | 385/92 |

FOREIGN PATENT DOCUMENTS

| | | | |
|---|---|---|---|
| 61-134712 | 6/1986 | Japan | G02B 6/42 |
| 62-248280 | 10/1987 | Japan | G02B 6/42 |
| 3-502377 | 5/1991 | Japan | G02B 6/42 |

*Primary Examiner*—Frank Gonzalez
*Attorney, Agent, or Firm*—Armstrong, Westerman, Hattori, McLeland and Naughton

[57] ABSTRACT

In optically coupling an optical fiber (8) inserted and fixed in a ferrule (10) to an optical device (12) provided in a housing (4), each part is mutually fixed by using a main ring (16) and a reinforcement ring (18), and a fixing point between the reinforcement ring (18) and the main ring (16) is positioned outside of a fixing point between the ferrule (10) and the main ring (16). With this constitution, the mechanical strength of an optical module can be improved, and the size of the optical module can be reduced.

20 Claims, 19 Drawing Sheets

FIG. IA
(PRIOR ART)
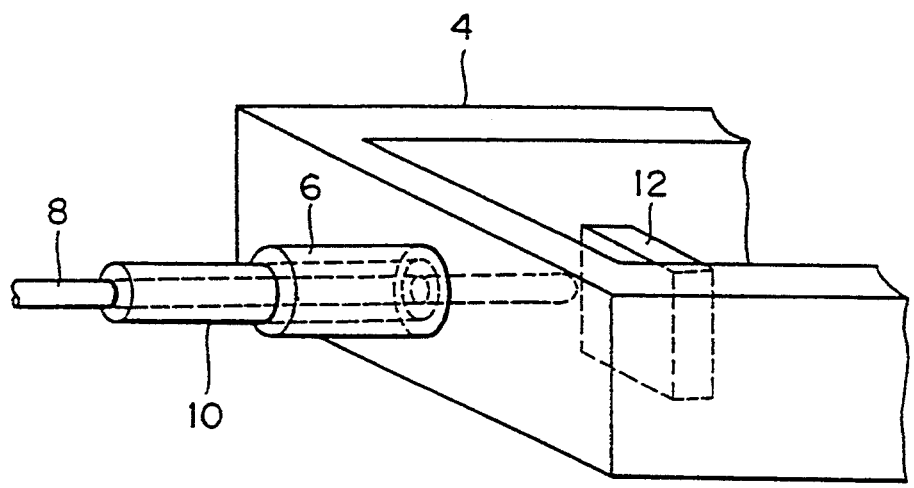
FIG. IB
(PRIOR ART)
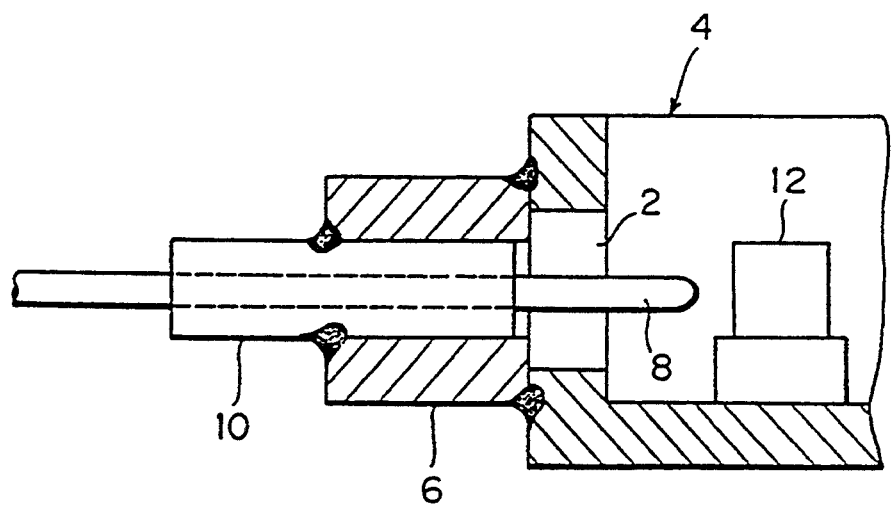

OPTICAL MODULE AND MANUFACTURING METHOD THEREFOR

TECHNICAL FIELD

The present invention relates to an optical module and a manufacturing method therefor.

In connection with an increase in communication demand, a transmission rate of multigigabit level has recently been required in an optical communication system. Further, an improvement in packaging density has also been required to cope with a reduction in size of equipment. To meet these requirements, it is essential in an optical module to develop an element technology such as an electrical packaging technology enabling a high-speed electric signal waveform to be transmitted with low distortion and low noise, or an optical packaging technology suitable for a reduction in size of a package and capable of maintaining a high optical coupling efficiency. Further, to ensure the reliability of the system for a long period of time, it is desired to adopt a hermetic sealing structure.

BACKGROUND ART

FIG. 1A is a cutaway perspective view of an optical module in the prior art, and FIG. 1B is a sectional view of the optical module shown in FIG. 1A.

This optical module includes a housing 4 having an opening 2 extending from the outer side to the inner side of the housing 4, a ring 6 fixed to the housing 4, a ferrule 10 fixed to the ring 6 under the condition where it is inserted in the ring 6, an optical fiber 8 fixed to the ferrule 10 under the condition where it is inserted in a center hole of the ferrule 10, and an optical device 12 such as a light receiving element provided in the housing 4 and adapted to be optically coupled with the optical fiber 8. Further, a manufacturing method for this optical module includes, for example, the first step of inserting into the ring 6 the ferrule 10 under the condition where the optical fiber 8 is inserted and fixed in the center hole of the ferrule 10, bringing an end surface of the ring 6 into close contact with an outer surface of the housing 4, and adjusting a relative positional relationship between the ferrule 10 and the ring 6 and a relative positional relationship between the ring 6 and the housing 4; and the second step of fixing the ferrule 10 to the ring 6 and fixing the ring 6 to the housing 4.

In the prior art mentioned above, the housing 4 can be reduced in height to thereby reduce the size of the optical module. However, when the height of the housing 4 is reduced, the wall thickness of the ring 6 is reduced to cause a reduction in mechanical strength. To prevent such a reduction in mechanical strength, there has been proposed a construction provided with a reinforcement member 14 so as to cover the ring 6 and the ferrule 10 as shown in FIG. 2 (Daniel S. Bargar: "An Automated Fiber Alignment, Fixing, and Hermetic Sealing System", SPIE Vol. 994, Optoelectric Materials, Devices, Packaging, and Interconnects II (1988), P. 11-17). According to this construction, a bending stress generating by application of an external force is absorbed by the reinforcement member 14, and is not directly applied to the ring 6. However, since the wall thickness of the reinforcement member 14 must be increased in order to obtain an effective strength, this structure is not always suitable for the reduction in size of the optical module.

It is an object of the present invention to provide an optical module and a manufacturing method therefor which can improve a mechanical strength and are suitable for a reduction in size.

It is another object of the present invention to provide an optical module which can effect hermetic seal, be suitable for a reduction in size, and be excellent in productivity.

Disclosure of Invention

In accordance with an aspect of the present invention, there is provided an optical module comprising a housing having an opening extending from an outer side to an inner side of said housing and having an outer surface around said opening; a main ring having a substantially central hole and fixed to said housing so that an end surface of said main ring is in close contact with said outer surface of said housing; a ferrule fixed to said main ring under a condition where said ferrule is inserted in said substantially central hole of said main ring; an optical fiber fixed to said ferrule under a condition where said optical fiber is inserted in a center hole of said ferrule; a reinforcement ring fixed to said main ring and said ferrule so as to cover said ferrule in juxtaposed relationship to said main ring, a fixing point between said reinforcement ring and said main ring being positioned outside of a fixing point between said reinforcement ring and said ferrule; and an optical device provided in said housing and adapted to be optically coupled with said optical fiber.

As described above, the reinforcement ring is fixed to the main ring and the ferrule, and the fixing point between the reinforcement ring and the main ring is positioned outside of the fixing point between the main ring and the ferrule. Accordingly a mechanical strength is improved in accordance with the principle to be hereinafter described. Further, as the outer diameter of the reinforcement ring can be made substantially equal to the outer diameter of the main ring, there is no possibility that the size of the optical module may become large because of use of the reinforcement ring.

In accordance with another aspect of the present invention, there is provided a manufacturing method for an optical module, comprising the first step of inserting a ferrule having a center hole in which an optical fiber is inserted and fixed, into a substantially central hole of a main ring, bringing an end surface of said main ring into close contact with an outer surface of a housing around an opening extending from an outer side to an inner side of said housing, and adjusting a relative positional relationship between said ferrule and said main ring and a relative positional relationship between said main ring and said housing under a condition where said ferrule is inserted in said substantially central hole of said main ring and said end surface of said main ring is in close contact with said outer surface of said housing; the second step of fixing said ferrule to said main ring and fixing said main ring to said housing; and the third step of fixing a reinforcement ring to said ferrule and said main ring so that said reinforcement ring covers said ferrule in juxtaposed relationship to said main ring, a fixing point between said reinforcement ring and said main ring being positioned outside of a fixing point between said ferrule and said main ring.

In accordance with a further aspect of the present invention, there is provided an optical module comprising a housing having an opening extending from an outer side to an inner side of said housing and having an outer surface around said opening; a ring having a substantially central hole and fixed to said housing so that an end surface of said ring is in close contact with said outer surface of said housing; a ferrule fixed to said ring under a condition where said ferrule is inserted in said substantially central hole of said ring; an optical fiber fixed to said ferrule under a condition where said optical fiber is inserted in a center hole of said ferrule; and an optical device provided in said housing and adapted to be optically coupled with said optical fiber; wherein said ferrule comprises a first pipe made of metal and a second pipe made of ceramic, said first pipe being formed with an axial hole having a diameter slightly larger than an outer diameter of a cover covering said optical fiber, said second pipe being formed with an axial hole as said center hole having a diameter slightly larger than an outer diameter of said optical fiber, said second pipe being inserted in said axial hole of said first pipe so as to project from an end surface of said first pipe.

BRIEF DESCRIPTION OF DRAWINGS

FIGS. 1A and 1B are a cutaway perspective view and a sectional view of an optical module in the prior art, respectively;

BEST MODE FOR CARRYING OUT THE INVENTION

There will now be described some preferred embodiments of the present invention in detail.

Figure 3:
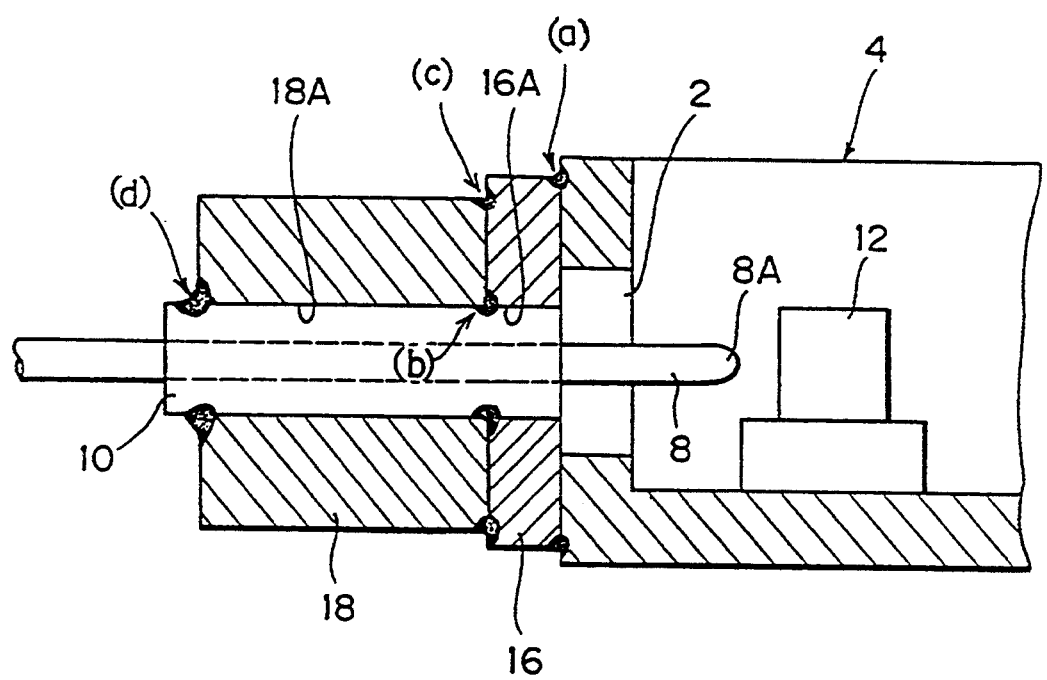
FIG. 3 is a sectional view of an optical module showing a preferred embodiment of the present invention.

FIG. 3 is a sectional view of an optical module showing a preferred embodiment of the present invention. Reference numeral 4 designates a housing having an upper opening. An optical device 12 is accommodated in the housing 4. The optical device 12 is selected from a photo-electric conversion element such as a photodiode, an electric-photo conversion element such as a light emitting diode (LED) or a laser diode (LD), and an optical wave-guide chip such as a wave-guide type optical modulator, for example. An optical fiber 8 to be optically coupled with the optical device 12 is introduced from the outside of the housing 4 to the inside thereof through an opening 2 formed through a side wall of the housing 4. In the following description, the optical device 12 is considered as a photo-electric conversion element, wherein light outgoing from an end portion 8A of the optical fiber 8 is incident upon the optical device 12. The end portion 8A of the optical fiber 8 is formed to have a tapering spherical shape. That is, the end portion 8A is formed by heating or the like so that a diameter of the optical fiber 8 at the end portion 8A continuously decreases toward the tip of the end portion 8A and that a portion near the tip is substantially semispherical. Owing to this shape that the end portion 8A of the optical fiber 8 is tapering and spherical, the end portion 8A functions as a lens to exhibit a focusing effect to the light radiated from the end portion 8A into the air, thereby easily increasing an optical coupling efficiency. The optical fiber 8 is inserted through a center hole of a cylindrical ferrule 10 and fixed therein. A portion of the optical fiber 8 on the outside of the ferrule 10 (i.e., a portion on the opposite side of the end portion 8A) is covered although not shown.

Reference numeral 16 designates a main ring directly fixed to a side surface of the housing 4. The main ring 16 is formed with a center hole 16A having a diameter slightly larger than an outer diameter of the ferrule 10. The center hole 16A of the main ring 16 is aligned with the opening 2 of the housing 4. The ferrule 10 is inserted into the center hole 16A and fixed to the main ring 16. Reference numeral 18 designates a reinforcement ring which is characteristic in the present invention. The reinforcement ring 18 is formed with a center hole 18A having a diameter substantially equal to the diameter of the center hole 16A of the main ring 16. Both the main ring 16 and the reinforcement ring 18 are cylindrical in this preferred embodiment. The ferrule 10 is inserted into the center hole 18A of the reinforcement ring 18, and an end surface of the reinforcement ring 18 is in contact with an end surface of the main ring 16. Under this condition, the reinforcement ring 18 is fixed to the main ring and the ferrule 10. In this preferred embodiment, all of the housing 4, the ferrule 10, the main ring 16, and the reinforcement ring 18 are made of a weldable material such as stainless steel, and the fixation of these members is effected by laser welding. More specifically, the ferrule 10 and the main ring 16 are fixed by laser welding at a plurality of points lying on the edge of the contact surface between the ferrule 10 and the main ring 16 on the opposite side of the housing 4; the main ring 16 and the housing 4 are fixed by laser welding at a plurality of points lying on the outer circumferential edge of the contact surface between the main ring 16 and the housing 4 (on a flat side surface of the housing 4); the reinforcement ring 18 and the main ring 16 are fixed by laser welding at a plurality of points lying on the outer circumferential edge of the contact surface between the reinforcement ring 18 and the main ring 16; and the reinforcement ring 18 and the ferrule 10 are fixed by laser welding at a plurality of points lying on the edge of the contact surface between the reinforcement ring 18 and the ferrule 10 on the opposite side of the housing 4. In each laser welding, the irradiation positions of laser beams are equally spaced on a circumference. In this preferred embodiment, each laser welding is carried out at four positions. The operation of the laser welding will be described later more specifically.

Prior to the description of the effect to be exhibited by the constitution of the optical module according to the present invention mentioned with reference to FIG. 3, a problem in the constitution of the conventional optical module will now be explained qualitatively and quantitatively.

Figure 4A:
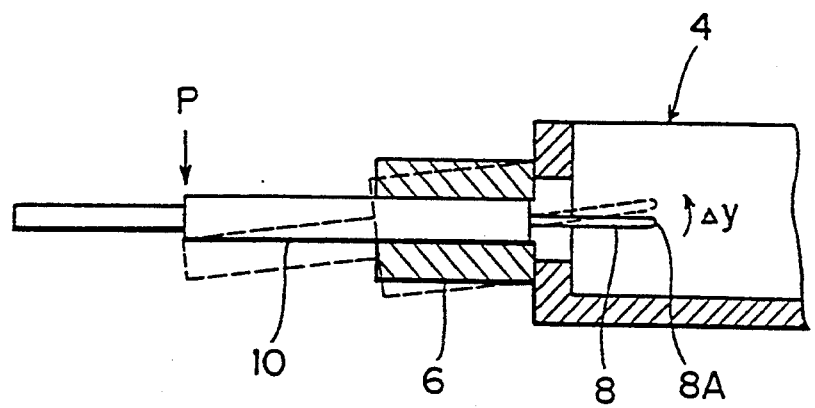
FIGS. 4A and 4B are views for qualitatively explaining a problem in the prior art.
Figure 4B:
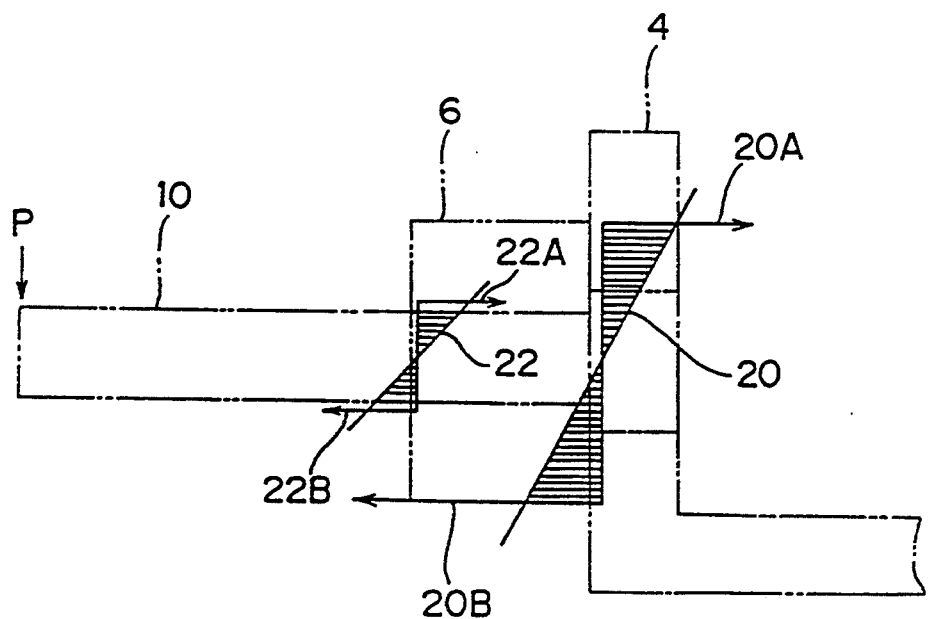

FIGS. 4A and 4B are views for qualitatively explaining the problem in the constitution of the conventional optical module. As shown in FIG. 4A, when an external force P is applied to the end of the ferrule 10 in a direction perpendicular to a longitudinal direction of the ferrule 10, both the ferrule 10 and the ring 6 are deflected to cause the slippage of the end portion 8A of the optical fiber 8 from an optically optimum adjusted position. Such slippage of the end portion of the optical fiber is remarkable in a small optical module. That is, when the height of the housing 4 is reduced, so as to make the size of the optical module small, the thickness of the ring 6 and the diameter of the ferrule 10 must be reduced to cause a reduction in sectional area of the ring 6 and the ferrule 10. As a result, the rigidity of these members is reduced to cause a large displacement of the optical fiber in receipt of a unit external force. FIG. 4B illustrates a stress distribution when an external force is applied to the end of the ferrule 10 like in FIG. 4A. In the stress distribution (shown by reference numeral 20) on the fixed surface between the housing 4 and the ring 6, arrows 20A and 20B denote a tensile stress and a compressive stress, respectively. In the stress distribution (shown by reference numerals 22) on the cross sectional surface of the ferrule 10 corresponding to the end surface of the ring 6, arrows 22A and 22B denote a tensile stress and a compressive stress, respectively. It is understood that the tensile stress or the compressive stress increases as an increase in radial distance in both stress distributions. When such a bending stress due to an external force (generally, a tensile stress or a compressive stress generated by bending is referred to as a "bending stress") exceeds a maximum permissible stress at a fixed portion formed by welding or the like, fracture occurs at the fixed portion.

Figure 5A:
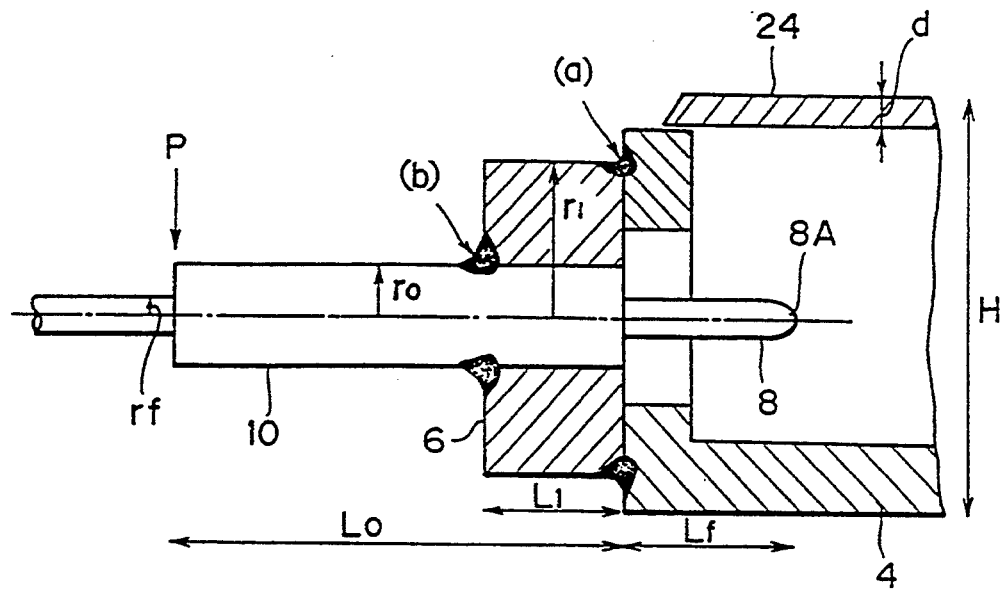
FIGS. 5A and 5B are views for quantitatively explaining the problem in the prior art.
Figure 5B:
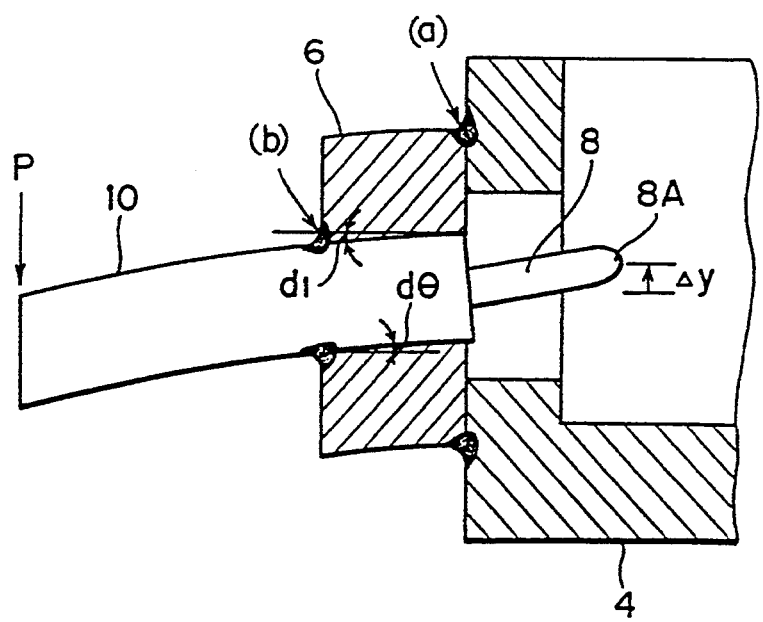

FIGS. 5A and 5B are views for quantitatively explaining the problem in the constitution of the conventional optical module. As referring to these figures, a mechanical strength at specific portions in the conventional constitution will now be examined. The fixation between the housing 4, the ring 6, and the ferrule 10 in the conventional constitution is effected by laser welding like in the preferred embodiment of the present invention shown in FIG. 3. For the convenience of explanation, the weld points between the housing 4 and the ring 6 will be referred to as points a, and the weld points between the ring 6 and the ferrule 10 will be referred to as points b. It is now supposed that an external force P is applied to the most effective position for fracture, that is, the end of the ferrule 10 as shown in FIG. 5A. If a maximum bending stress due to the external force P is sufficiently smaller than a fracture strength of the material of the ring, the ferrule 10 and the housing 4 and a fracture strength of the welded portions, the fracture due to the external force does not occur. The maximum bending stress points to be considered are the points a and the points b. A bending stress $\sigma_a$ at the points a and a bending stress $\sigma_b$ at the points b are given by Expressions (1) and (2), respectively.

$$\sigma_a = (4 \cdot L_0 \cdot P)/[\pi(r_1^3 - r_0^4/r_1)] \tag{1}$$

$$\sigma_b = 4(L_0 - L_1) \cdot P/[\pi \cdot (r_0^3 - r_f^4/r_0)] \tag{2}$$

where $L_0$ and $L_1$ represent the lengths of the ferrule 10 and the ring 6, respectively; and $r_0$, $r_1$, and $r_f$ represent the outer diameter of the ferrule 10, the outer diameter of the ring 6, and the inner diameter of the ferrule 10, respectively.

It is understood from Expression (1) that a reduction in the bending stress $\sigma_a$ at the points a is effected by reducing the length $L_0$ of the ferrule 10, enlarging the outer diameter $r_1$ of the ring 6, or reducing the outer diameter $r_0$ of the ferrule 10. As to the length $L_0$ of the ferrule 10, it is necessary to ensure some length enough for the ferrule 10 to hold the optical fiber 8. In the case where the height H of the housing 4 is preliminarily restricted by the need of making the size of the optical module small, the upper limit of the outer diameter $r_1$ of the ring 6 is also limited according to Expression (3).

$$r_1 = (H-d)/2 - w \tag{3}$$

where d represents the thickness of a lid 24 fixed to the upper portion of the housing 4; and w represents a weld length.

It is understood from the above examination that the outer diameter $r_0$ of the ferrule 10 is to be reduced as greatly as possible, so as to reduce the bending stress $\sigma_a$ at the points a. Additionally, it is understood from Expression (2) that the length $L_1$ of the ring 6 is to be enlarged, so as to reduce the bending stress $\sigma_b$ at the points b.

Next, there will be examined a position slip quantity $\Delta y$ of the end portion 8A of the optical fiber 8 when the external force P is applied to the end of the ferrule 10. As shown in FIG. 5B, this position slip can be analyzed with a cantilever model wherein the ferrule 10 and the ring 6 are assumed as an integral structure. The position slip quantity $\Delta y$ of the end portion 8A of the optical fiber 8 is given by Expression (4).

$$\Delta y = (L_f + L_1) \cdot d\theta - d_1 \tag{4}$$

where $d_1$ and $d\theta$ represent a deflection quantity and a deflection angle at the points b, respectively; and $L_f$ represents a length from the end surface of the ferrule 10 to the end of the optical fiber 8.

The deflection angle $d\theta$ and the deflection quantity $d_1$ at the points b are given by Expressions (5) and (6), respectively.

$$d\theta = P \cdot (L_0 \cdot L_1^2 / 2) / (E \cdot I) \quad (5)$$

$$d_1 = P \cdot (L_0 \cdot L_1^2 / 2 - L_1^3 / 6) / (\cdot I) \quad (6)$$

where E represents a Young's modulus of the material of the ring 6, and I represents a geometrical moment of inertia $[=(r_1^4 - r_0^4) \cdot \pi / 4]$ of the ring 6.

Expressions (5) and (6) are inserted into Expression (4) and rearranged to obtain Expression (7).

$$\Delta y = P \cdot L_1 \cdot [6 \cdot L_0 \cdot L_f - 2 \cdot L_1^2 - 3 \cdot L_1 \cdot (L_f - L_0)] / (6 \cdot E \cdot I) \quad (7)$$

It is understood from the above analysis that a reduction in the length $L_1$ of the ring 6 is effective to reduce the position slip quantity $\Delta y$ of the end portion 8A of the optical fiber 8. On the other hand, the length $L_1$ of the ring 6 must be enlarged, so as to reduce the bending stress $\sigma_b$ at the points b as mentioned above. Accordingly, the constitution of the conventional optical module cannot satisfy both the reduction in the position slip quantity $\Delta y$ at the end portion 8A of the optical fiber 8 and the reduction in the bending stress $\sigma_b$ at the points b when a unit external force is applied to the ferrule 10.

Next, the constitution of the preferred embodiment shown in FIG. 3 will be examined. Like the weld points a and b shown in FIGS. 5A and 5B, the weld points between the main ring 16 and the housing 4 will be referred to as points a, and the weld points between the main ring 16 and the ferrule 10 will be referred to as points b. Furthermore, the weld points between the reinforcement ring 18 and the main ring 16 will be referred to as points c, and the weld points between the reinforcement ring 18 and the ferrule 10 will be referred to as points d. When the parameters (the outer diameter $r_1$ and the length $L_1$) relating to the ring 6 shown in FIG. 5A are applied to the main ring 16 in the preferred embodiment shown in FIG. 3, most of the analysis results from Expressions (1) to (7) can be applied to the preferred embodiment shown in FIG. 3 without any changes. However, since the reinforcement ring 18 are welded to the main ring 16 and the ferrule 10 at the points c and the points d, respectively, in the preferred embodiment shown in FIG. 3, it differs from the prior art shown in FIGS. 5A and 5B in the following points.

Figure 2:
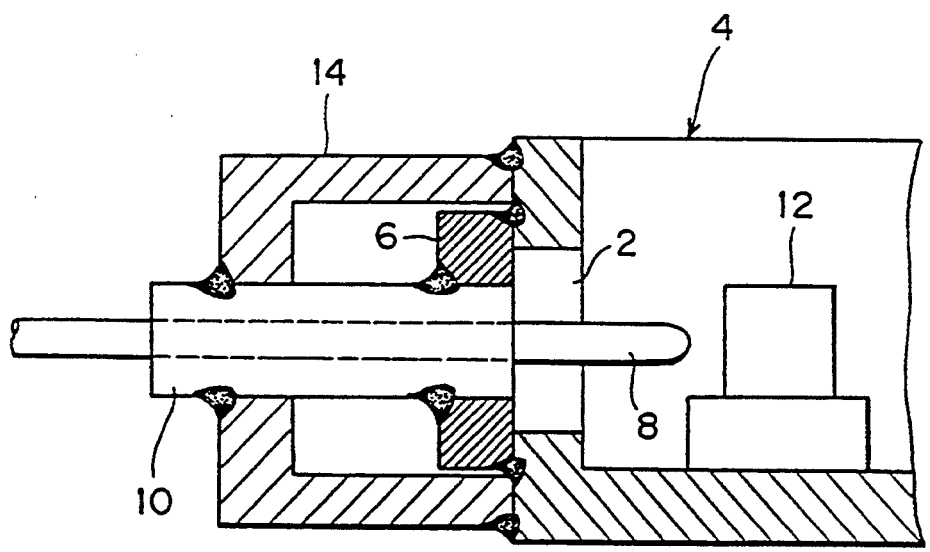
FIG. 2 is a sectional view of another optical module in the prior art.

In the preferred embodiment shown in FIG. 3, the points b are present always radially inside of the points c, so that it is apparent that the stress at the points b is smaller than the stress at the points c. Further, since the inner diameter of the reinforcement ring 18 is substantially equal to the inner diameter of the main ring 16, the bending stress $\sigma_b$ at the points b is ignorable, and it is sufficient to consider the bending stress $\sigma_a$ at the points a only. As a result, the length $L_1$ of the ring (main ring) causing the relationship of trade-off between the strength and the position slip quantity in the prior art is limited by Expression (7) only in the preferred embodiment, so that both the reduction in the bending stress and the reduction in the position slip quantity at the end portion of the optical fiber can be satisfied when a unit external force is applied to the ferrule. That is, according to the preferred embodiment shown in FIG. 3, since the reinforcement ring 18 is welded to the main ring 16 and the ferrule 10 at the points c and the points d, respectively, the bending stress at the points a can be reduced by reducing the outer diameter $r_0$ of the ferrule 10, and simultaneously the position slip quantity of the end portion 8A of the optical fiber 8 can be reduced by reducing the length $L_1$ of the main ring 16. Further, since a reinforcement member larger in diameter than the ring as in the prior art shown in FIG. 2 is not necessary in the preferred embodiment shown in FIG. 3, the height of the housing 4 can be reduced with the limitation of Expression (3) yet applied, thus effecting a reduction in size of the optical module.

Figure 6:
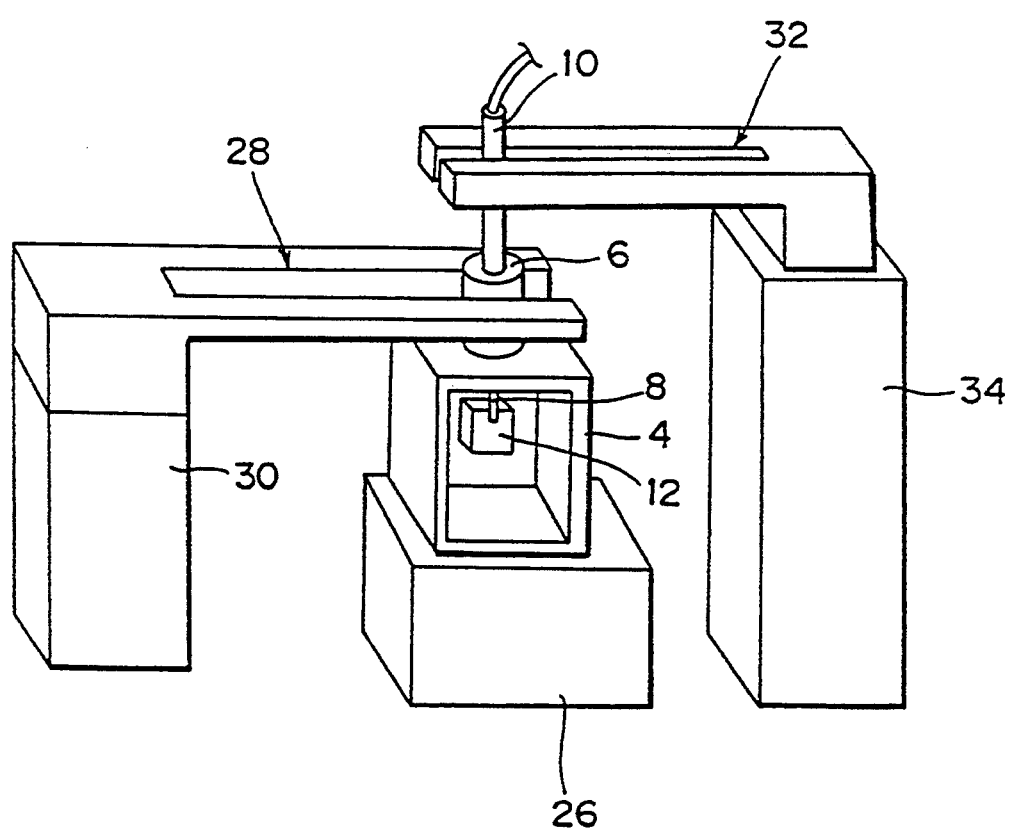
FIG. 6 is a perspective view of a position adjusting apparatus for use in manufacturing of an optical module.

Now, a manufacturing method for the optical module in the preferred embodiment shown in FIG. 3 will be described. FIG. 6 is a perspective view of a position adjusting apparatus that is usable in manufacturing the optical module. Although there is shown in FIG. 6 a condition where position adjustment for the conventional optical module is carried out, for the convenience of explanation to follow, this position adjusting apparatus may be used also in manufacturing the optical module according to the present invention. The optical module is temporarily fixed on a stage 26 with the ferrule 10 and the ring 6 located over the housing 4. Reference numeral 28 designates a clamper for temporarily holding the ring 6. The clamper 28 is movable in two directions perpendicular to each other on a horizontal plane by a fine adjusting bed 30. Reference numeral 32 designates a clamper for temporarily holding the ferrule 10. The clamper 32 is movable in two directions perpendicular to each other on a horizontal plane and in a vertical direction. In the following description adopted is a three-dimensional coordinate system X-Y-Z having an X-axis and a Y-axis perpendicular to each other on a horizontal plane and having a Z-axis in a vertical direction (a longitudinal direction of the optical fiber) in the system shown in FIG. 6. The position adjustment of the end portion of the optical fiber 8 in the X and Y directions is carried out by moving the ring 6 and the ferrule 10 in the X and Y directions by means of the clampers 28 and 32. The position adjustment of the end portion of the optical fiber 8 in the Z direction is carried out by moving the ferrule 10 in the Z direction by means of the clamper 32. After a predetermined positional relationship of each member is obtained, each member is fixed together by laser welding.

Figure 7A:
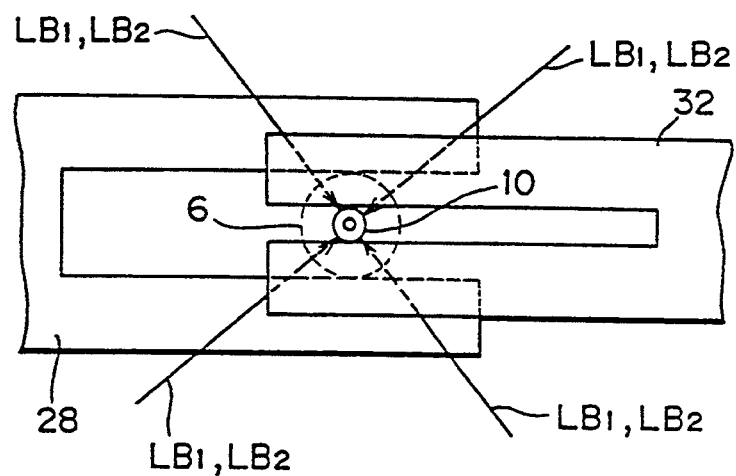
FIGS. 7A and 7B are views for explaining the directions of irradiation of laser beams in performing laser welding.
Figure 7B:
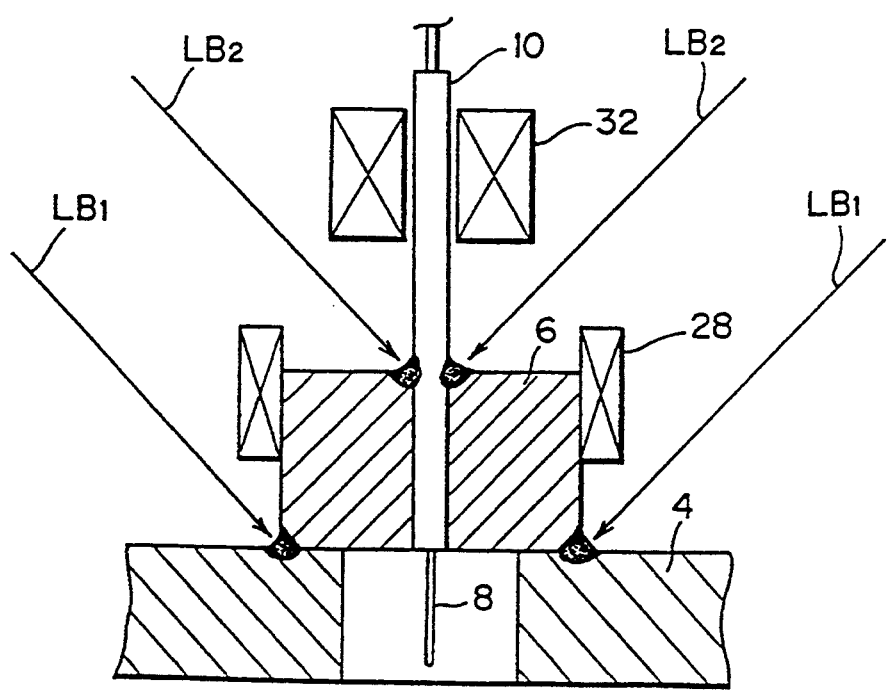
Figure 8:
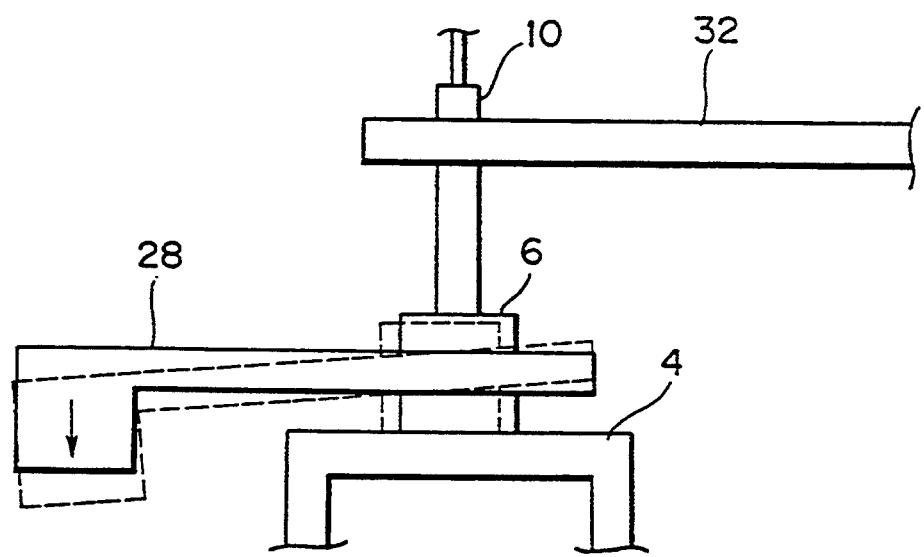
FIG. 8 is a view for explaining the position slip of a ring relative to a housing.

FIGS. 7A and 7B are views for explaining the directions of irradiation of laser beams, wherein FIG. 7A is a top plan view of FIG. 6, and FIG. 7B is a sectional side view of FIG. 6. Reference characters $LB_1$ designate the directions of irradiation of laser beams in the laser welding of the housing 4 and the ring 6, and reference characters $LB_2$ designates the directions of irradiation of laser beams in the laser welding of the ring 6 and the ferrule 10. In each laser welding, the laser beams are simultaneously directed in three or four directions (four directions being shown). The structure and the arrangement of the clampers 28 and 32 are decided so as not to cut off the laser beams. A problem occurring in simultaneously fixing each member at plural points by laser welding is position slip of the ring 6 in the X-Y plane due to unbalance of a stress generating in solidification of welded portions. In the worst case, the position ship of tens of $\mu m$ may occur. In order to prevent the position slip of the ring 6, it is a general way to press the ring 6 against the housing 4 under the condition where the ring 6 is held by the clamper 28. In this case, a press load to be applied to the clamper 28 is set to several kg, for example. However, the application of such a relatively large load to the clamper 28 causes a problem that the clamper 28 is deformed to cause the position slip of the ring 6 in the X-Y plane as shown in FIG. 8. Further, also in performing the laser welding of the ring 6 and the ferrule 10, the relative positional relationship therebetween slips.

Figure 9A:
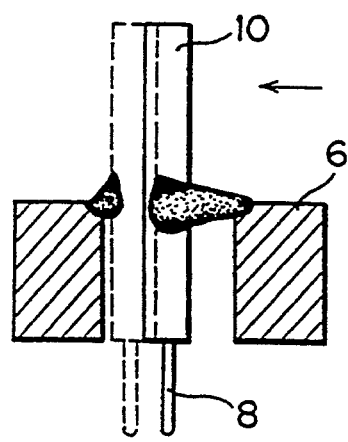
FIGS. 9A, 9B, and 9C are views for explaining the position slip and the angle slip of a ferrule relative to the ring.
Figure 9B:
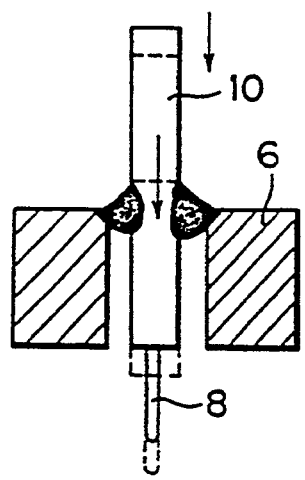
Figure 9C:
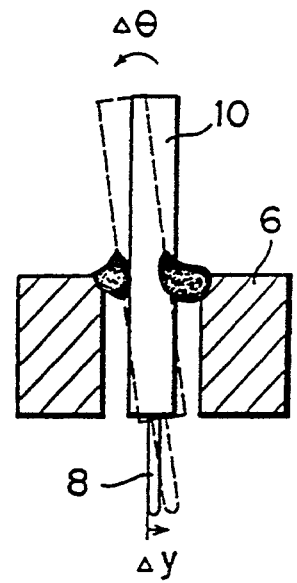

This phenomenon will be described with reference to FIGS. 9A to 9C. First, as shown in FIG. 9A, it has been confirmed that the ferrule 10 slips in position in the X-Y plane because of unbalance of a stress generating in solidification of welded portions when the laser welding is performed simultaneously at plural points. Secondly, as shown in FIG. 9B, it has been confirmed that the ferrule 10 slips in position in the Z direction because a Z-directional component of the stress generating in solidification of the welded portions is synthesized. Thirdly, as shown in FIG. 9C, it has been confirmed that the ferrule 10 is inclined from the Z-direction because of the stress unbalance similar to that in FIG. 9A. Finally, it has become apparent that the position slip shown in FIG. 9A is relatively small, and the position slip and the angle slip shown in FIGS. 9B and 9C are dominant.

Figure 10:
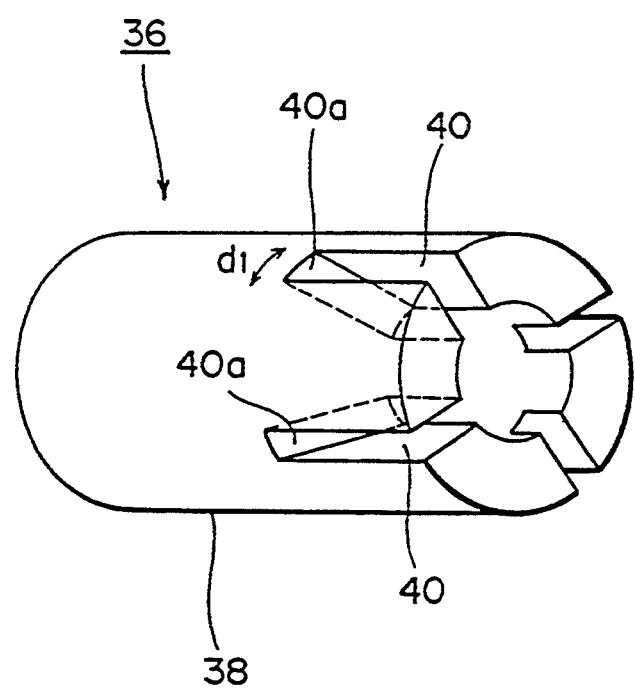
FIG. 10 is a perspective view of a ring-shaped press jig suitable for manufacturing of the optical module shown in FIG. 3.

FIG. 10 is a perspective view of a jig suitable for manufacturing of the optical module shown in FIG. 3. Reference numeral 36 generally designates a ring-shaped press Jig formed from a cylindrical member 38 having a plurality of recesses 40 extending from one end of the member 38. In this preferred embodiment shown in FIG. 10, four recesses 40 are formed at circumferentially equal intervals in accordance with the four positions of irradiation of laser beams in the laser welding of the ferrule and the ring.

Figure 11:
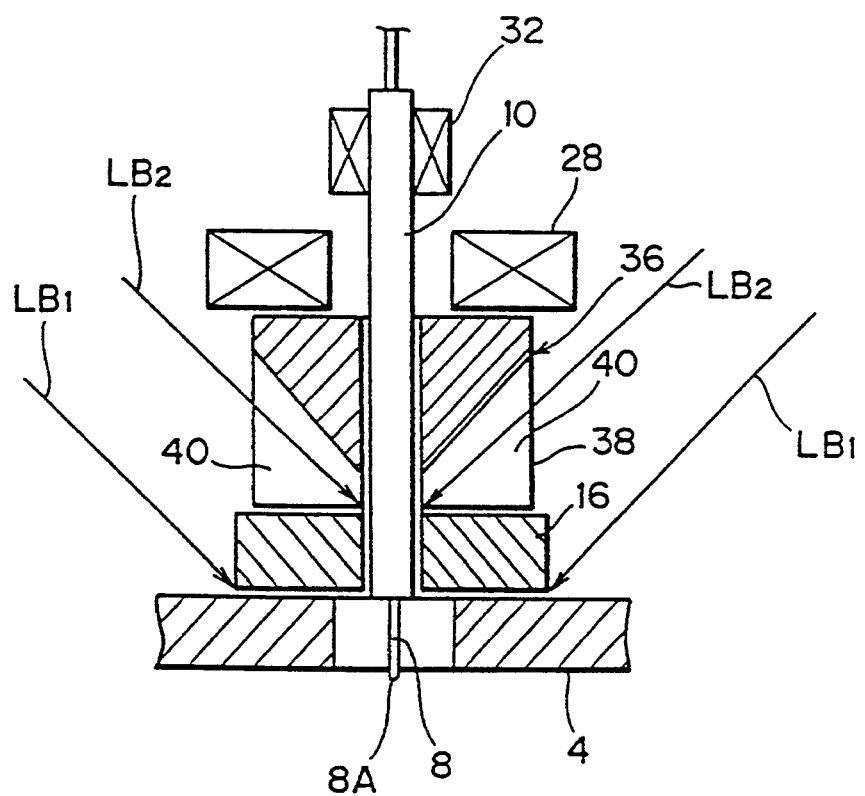
FIG. 11 is a view for explaining the method of use of the ring-shaped press jig shown in FIG. 10.

FIG. 11 is a view for explaining a method of use of the ring-shaped press jig 36 shown in FIG. 10, wherein the irradiation of laser beams in the preferred embodiment is illustrated in contrast with FIG. 7B. In manufacturing the optical module in the preferred embodiment, the ferrule 10 including the optical fiber 8 inserted and fixed therein is inserted into the center hole of the main ring 16, and the position of the main ring 16 is roughly set under the condition where the main ring 16 is in close contact with the outer surface of the housing 4. The set position of the main ring 16 may be determined by making the light outgoing from the end portion 8A of the optical fiber 8 incident upon a light receiving portion of an optical device (photo-electric conversion element) to be optically coupled with the optical fiber 8, and measuring an optical coupling efficiency at this time. Then, the main ring 16 is pressed against the housing 4 by the clamper 28 through the ring-shaped press jig 36. After thus setting the position of the main ring 16 relative to the housing 4, the main ring 16 cannot be easily moved in the X-Y plane. Thereafter, the ferrule 10 is moved by the clamper 32 within a slightly movable range in the X-Y plane as limited by the center hole of the main ring 16 and in the Z-direction, direction, and the position of the ferrule 10 is set so as to obtain a maximum optical coupling efficiency. The order of position adjustment for the main ring 16 and the ferrule 10 is not limited to the above. After thus setting the positions of the main ring 16 and the ferrule 10, laser beams are directed from the obliquely upper side of the main ring 16 along the arrows shown by the reference characters $LB_1$ to thereby perform the laser welding of the main ring 16 and the housing 4. Further, laser beams are directed from the obliquely upper side of the ring-shaped press jig 36 through the recesses 40 of the ring-shaped press jig 36 along the arrows shown by the reference characters $LB_2$ to thereby perform the laser welding of the main ring 16 and the ferrule 10.

Figure 12:
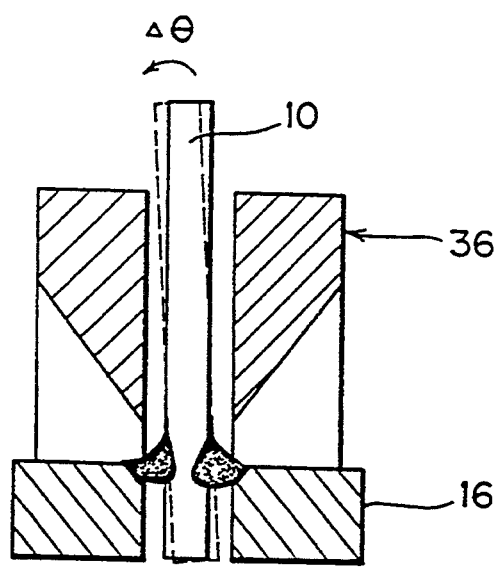
FIG. 12 is a view for explaining the effect of use of the ring-shaped press jig for the angle slip of the ferrule.

According to the preferred embodiment, the clamper 28 is arranged on the end surface of the ring-shaped press jig 36 to press the main ring 16 against the housing 4. Accordingly, a sectional shape or the like of the clamper 28 is not limited by the directions and the positions of irradiation of laser beams unlike the method shown in FIG. 7B. Accordingly, a large force can be applied to the contact surface between the main ring 16 and the housing 4 by using the clamper 28 having a relatively large thickness, thereby preventing the position slip of the main ring 16 in the X-Y plane due to the unbalance of the stress generating in solidification of welded portions when the laser welding is performed simultaneously at plural points. Further, the angle slip of the ferrule 10 occurring in performing the laser welding of the ferrule 10 and the main ring 16 (see FIG. 9C) can be greatly reduced as compared with that in the conventional method because the ring-shaped press jig 36 is arranged around the ferrule 10 as shown in FIG. 12. For example, assuming that the clearance between the inner diameter of the ring-shaped press jig 36 and the outer diameter of the ferrule 10 is substantially equal to the clearance between the inner diameter of the main ring 16 and the outer diameter of the ferrule 10, and that the length of the ring-shaped press jig 36 is substantially equal to the length of the main ring 16, the maximum angle slip of the ferrule 10 possibly occurring in performing the laser welding of the ferrule 10 and the main ring 16 can be reduced to about ½ as compared with the case where the ring-shaped press jig 36 is not used. Further, since the laser welding can be performed simultaneously at plural points according to the preferred embodiment, strong fixation of each member can be effected. In particular, since the plural points of the laser welding are positioned at equal intervals on a circle along the outer circumference of the ferrule 10 or the main ring 16, the stress generating in solidification of the welded portions can be made uniform to thereby effect balanced fixation on the X-Y plane. In setting the positions of irradiation of laser beams in the laser welding at circumferential equal intervals in the prior art, marks as targets of irradiation need to be preliminarily formed on the ring or the like to direct laser beams upon the marks, causing a reduction in operability. To the contrary, according to the preferred embodiment, the positions of irradiation of laser beams can be automatically set only by directing the laser beams along the recesses 40 of the ring-shaped press Jig 36, thus eliminating the need of forming the marks in the prior art.

Figure 13:
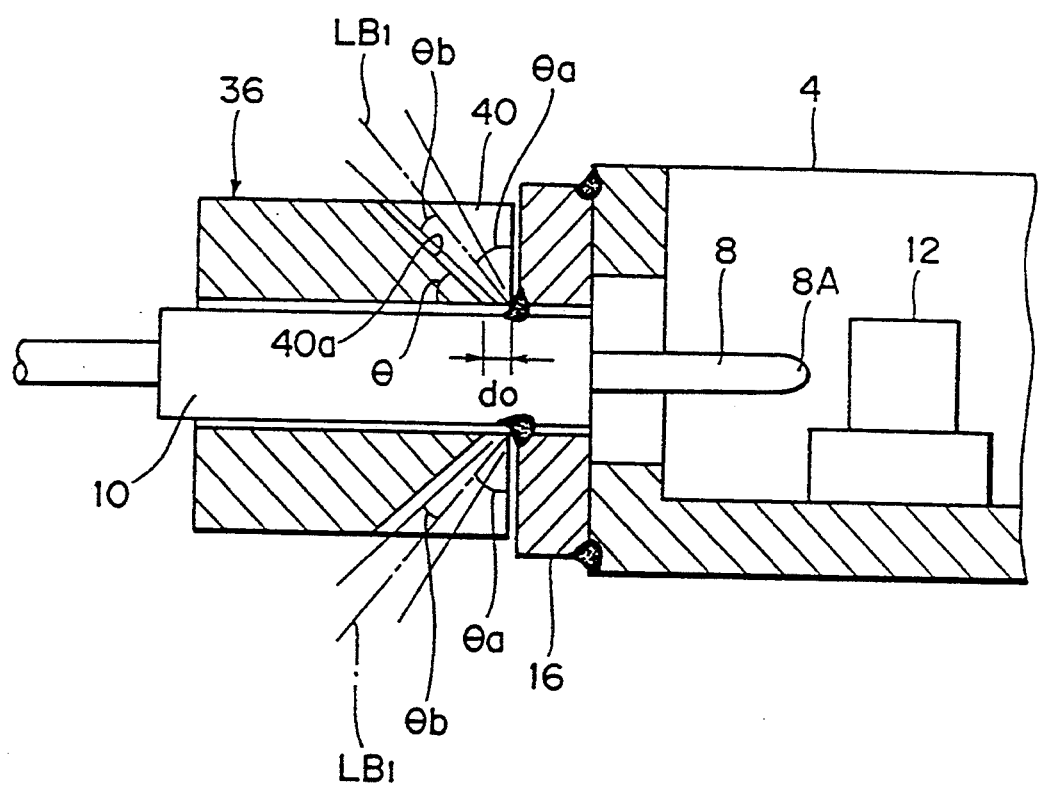
FIG. 13 is a view for explaining the shape of recesses of the ring-shaped press jig shown in FIG. 10.

The shape of each recess 40 of the ring-shaped press jig 36 may be set as shown in FIG. 13. For example, the width $d_1$ (see FIG. 10) and the depth of each recess 40 of the ring-shaped press jig 36 and the angle 8 of inclination of a bottom surface 40a of each recess 40 are set according to the angle $8_a$ of irradiation of the laser beam and the shape of the laser beam so that the laser beam may not be cut off by the ring-shaped press jig 36 in performing the laser welding of the ferrule 10 and the main ring 16. More specifically, the inclination angle 8 of the bottom surface 40a of each recess 40 is set substantially equal to the complementary angle of an angle corresponding to the sum of the irradiation angle $\theta_a$ of the laser beam and the angle $\theta_b$ of divergence of the laser beam. Further, both the width $d_1$ of each recess 40 and the length $d_0$ of each recess 40 at the inner-diameter portion of the ring-shaped press jig 36 are set larger than the diameter of the irradiation beam pattern.

According to the method of the preferred embodiment, since the ring-shaped press jig 36 is used, the housing 4, the main ring 16, and the ferrule 10 can be fixed together with no occurrence of the position slip and the angle slip after adjusting the relative positional relationship between the main ring 16 and the housing 4 and the relative positional relationship between the ferrule 10 and the main ring 16. After fixing the housing 4, the main ring 16 and the ferrule 10 to each other, the ring-shaped press jig 36 is removed, and the reinforcement ring 18 shown in FIG. 3 is then laser-welded to the main ring 16 and the ferrule 10, thereby completing the optical module shown in FIG. 3. Alternatively, as will be hereinafter described, the ring-shaped press Jig 36 may be used instead of the reinforcement ring 18, wherein the jig 36 is fixed to the main ring 16 and the ferrule 10.

Figure 14:
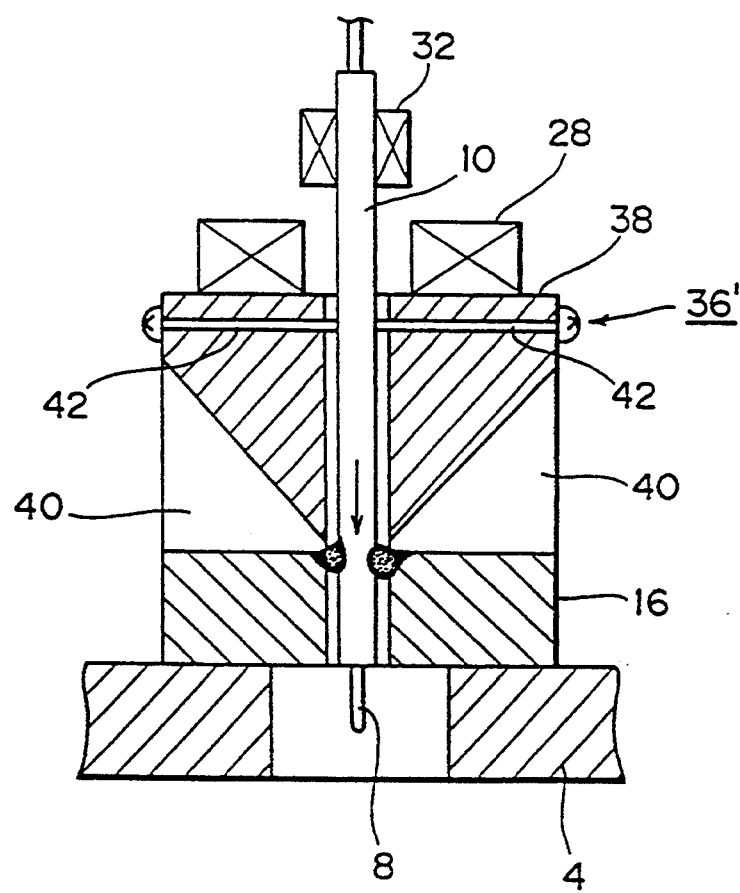
FIG. 14 is a view showing another ring-shaped press jig suitable for manufacturing of the optical module shown in FIG. 3.

FIG. 14 is a sectional view showing another preferred embodiment of the ring-shaped press jig. In this preferred embodiment, a ring-shaped press jig 36' is provided with means for temporarily fixing the ferrule 10 at an end portion of the cylindrical member 38 on the opposite side of the recesses 40, in addition to the constitution of the ring-shaped press Jig 36 shown in FIG. 10. More specifically, this means is constructed of a plurality of (e.g., four) screws 42 threadedly engaged in the cylindrical member 38 so as to extend from an outer circumferential portion toward an inner circumferential portion thereof. The screws 42 are arranged at equal intervals in the circumferential direction of the cylindrical member 38. The screws 42 serve to limit the movement of the ferrule 10 in the longitudinal direction thereof in performing the laser welding of the ferrule 10 and the main ring 16. The effect owing to the screws 42 is as follows:

In performing the laser welding of the ferrule 10 and the main ring 16, the Z-directional component of the stress generating in solidification of welded portions is synthesized to thereby draw the ferrule 10 in the Z direction as previously described with reference to FIG. 9B. According to the preferred embodiment, however, in performing the laser welding of the ferrule 10 and the main ring 16, the ferrule 10 is held by the clamper 32, and additionally the ferrule 10 is tightened sidewise by the screws 42 of the ring-shaped press jig 36', thereby effectively preventing the position slip of the ferrule 10 in the Z direction in performing the laser welding. The difference between the case where the position slip of the ferrule 10 in the Z direction is limited by the clamper 32 only and the case where the position slip of the ferrule 10 in the Z direction is limited by the screws 42 of the ring-shaped press jig 36' will now be described with reference to FIGS. 15A and 15B.

Figure 15A:
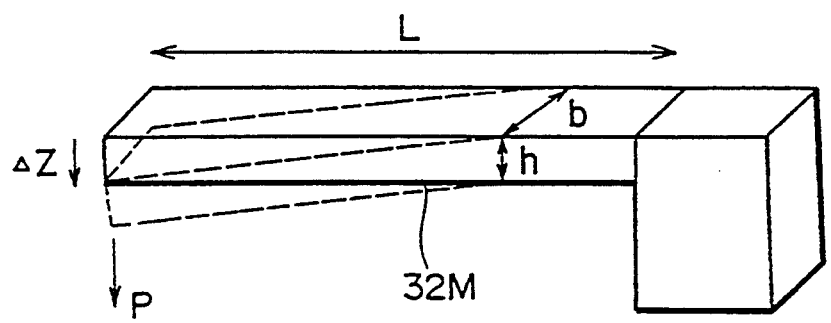
FIGS. 15A and 15B are views for explaining the deflections of a modeled clamper and a modeled ring-shaped press jig, respectively.

Referring to FIG. 15A, reference numeral 32M designates a model for analyzing the deflection when a force is applied to the end of the clamper 32 in the Z direction. A maximum position slip quantity $\Delta Z$ in the Z direction is equivalent to the deflection of an arm of the clamper, and is given by Expression (8).

$$\Delta Z = 4 \cdot P \cdot L^3 / (E \cdot b \cdot h^3) \quad (8)$$

where P represents a synthesized stress in the Z direction in performing the laser welding; L the length of the arm; E a Young's modulus of the material of the arm; b the width of the arm; and h the thickness of the arm.

Figure 15B:
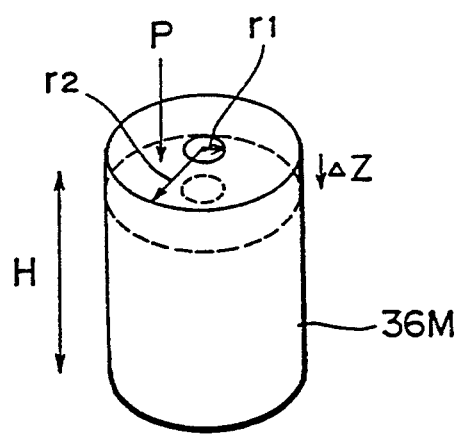

Referring to FIG. 15B, reference numeral 36M designates a model for analyzing the deflection of the ring-shaped press Jig 36'. In this case, the position slip of the ferrule in the Z direction in performing the laser welding is equivalent to the deflection of the ring-shaped press jig in the Z direction, and is given by Expression (9).

$$\Delta Z = P \cdot H / (E \cdot S) \quad (19)$$

where P represents a synthesized stress in the Z direction generating in performing the laser welding; H the length of the ring-shaped press jig; and S the effective sectional area of the ring-shaped press jig. For example, when the values of P=10 kg, L =20 mm, h =5 mm, b =4 mm, and E =20×10³ kg/mm² are inserted into Expression (8), $\Delta Z$ becomes 32 μm. On the other hand, when the values of P=10 kg, E =20×10³ kg/mm², H=6 mm, and S=9 mm² are inserted into Expression (9), $\Delta Z$ becomes 0.3 μm. Thus, it is understood that the position slip of the ferrule in the Z direction in performing the laser welding can be greatly reduced by the use of the ring-shaped press jig.

Figure 16:
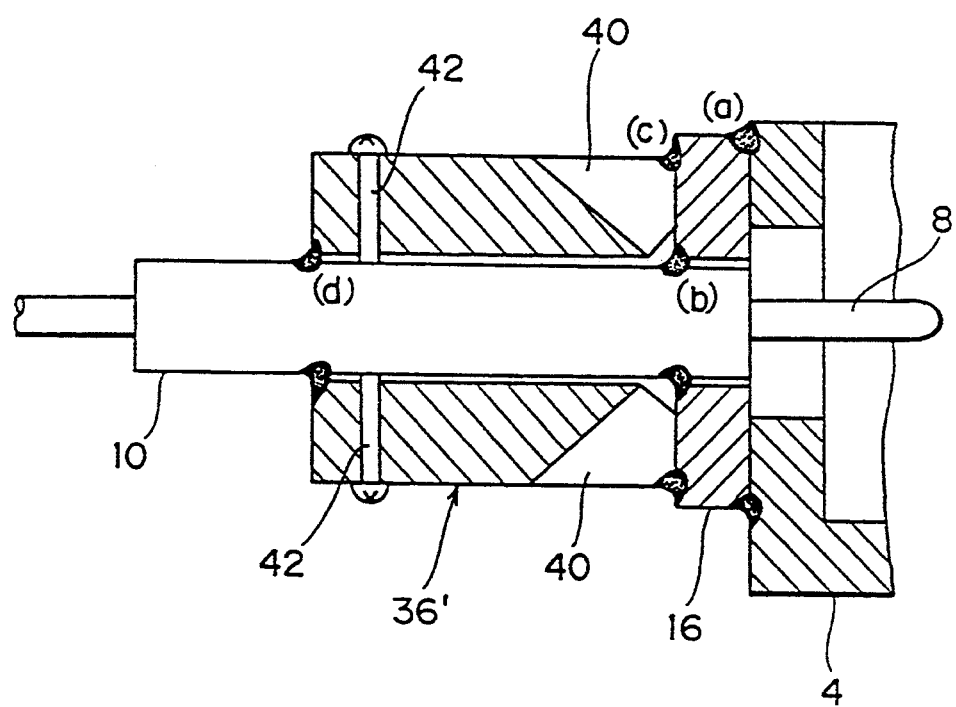
FIG. 16 is a sectional view of an optical module showing another preferred embodiment of the present invention using the ring-shaped press jig shown in FIG. 14 also as a reinforcement ring.

FIG. 16 is a sectional view showing a preferred embodiment using the ring-shaped press jig serving also as the reinforcement ring. In this preferred embodiment, the ring-shaped press jig 36' shown in FIG. 14 is used to perform the laser welding at the points a between the housing 4 and the main ring 16 and the laser welding at the points b between the main ring 16 and the ferrule 10. Thereafter, the ring-shaped press jig 36' is laser-welded to the main ring 16 and the ferrule 10 at the points c and the points d (corresponding to the points c and the points d shown in FIG. 3), respectively. According to this method, not only the effect by the method using the ring-shaped press jig 36' is obtained, but also the effect by the constitution shown in FIG. 3 is obtained in the optical module to be manufactured. In this preferred embodiment, the screws 42 of the ring-shaped press jig 36' may be removed after the completion of the laser welding at the points a to d.

Figure 17:
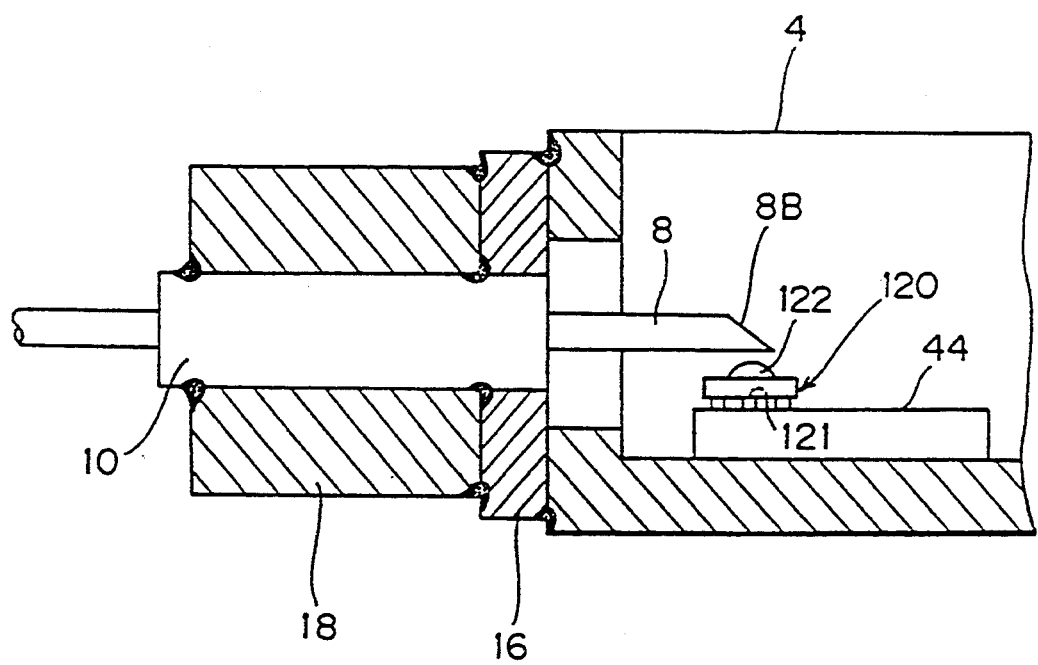
FIG. 17 is a sectional view of an optical module showing another preferred embodiment of the present invention.

FIG. 17 is a sectional view showing another preferred embodiment of the optical module of the present invention. This preferred embodiment is different from the preferred embodiment shown in FIG. 3 in the following points. As one point, an end surface 8B of an optical fiber 8 shown in FIG. 17 is inclined with respect to a plane perpendicular to a geometrical center line of the optical fiber 8 so as to make the light propagated in the optical fiber 8 reflect on the end surface 8b and outgo sidewise from the optical fiber 8. As another point, an optical device suitable for the above constitution is used in this preferred embodiment. The optical device to be optically coupled with the optical fiber 8 includes a light receiving element 120 of a back surface incident type having an electrode surface 121 and a lens 122 integrally provided on the other surface opposite to the electrode surface 121. The light receiving element 120 is mounted by flip chip bonding on a printed circuit board 44 fixed on the bottom surface of the housing 4. According to this constitution, a mounting height in the housing 4 can be reduced to thereby effect a reduction in size of the optical module in connection with the effect to be obtained by the use of the main ring 16 and the reinforcement ring 18. Furthermore, since the light receiving element 120 itself has a lens, a high optical coupling efficiency or a wide tolerance to the position slip can be ensured. Further, since the light receiving element of the back surface incident type is easily mounted by flip chip bonding, a reactance in an electrical circuit portion can be reduced to thereby effect a high-speed operation.

The above-mentioned preferred embodiments are also applicable to an optical module including a light emitting element such as a laser diode or a light emitting diode and an optical fiber to be optically coupled therewith, or applicable to an optical module including an optical wave-guide chip and an optical fiber to be optically coupled therewith. Further, in providing a parallel light beam system in the housing of the optical module, a ferrule incorporating a lens therein may be used, and an optical fiber may be inserted to a midway portion of the ferrule and fixed therein.

Figure 18:
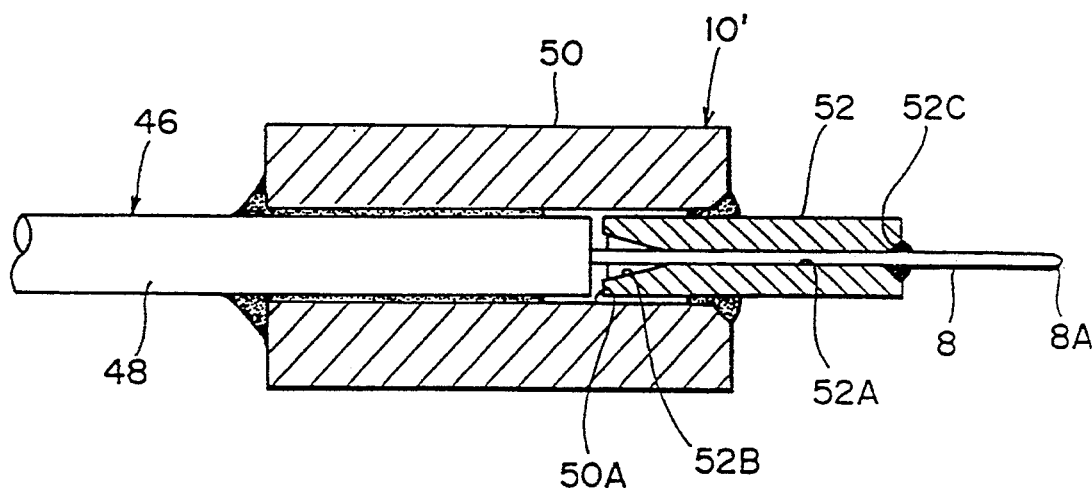
FIG. 18 is a vertical sectional view of a ferrule suitable for hermetic seal applicable to the present invention.

FIG. 18 is a vertical sectional view of a ferrule suitable for hermetic seal in an optical module. Reference numeral 46 designates an optical fiber code consisting of an optical fiber 8 and a cover 48 covering the periphery of the optical fiber 8. For example, the cover 48 consists of a primary cover made of silicone rubber or the like and a secondary cover made of nylon or the like. Reference numeral 10' designates a ferrule consisting of a first pipe 50 made of metal and a second pipe 52 made of ceramic. The first pipe 50 is formed with a center hole 50A having a diameter slightly larger than an outer diameter of the cover 48. The second pipe 52 is partially inserted in the center hole 50A of the first pipe 50 in such a manner that about a half in length of the second pipe 52 projects from the end surface of the first pipe 50. The second pipe 52 is formed with a center hole 52A having a diameter slightly larger than an outer diameter of the optical fiber 8. A clearance between the first pipe 50 and the second pipe 52 over the circumference is preliminarily sealed by a brazing material having a relatively high melting point, thereby fixing the second pipe 52 to the first pipe 50. In using a brazing material containing silver as a main component, the melting point of the brazing material is about 610° C. The optical fiber 8 is inserted from a first end of the second pipe 52 into the center hole 52A, and an excitation end of the optical fiber 8 (e.g., the end portion 8A having the tapering, spherical shape as previously mentioned) is projected from a second end of the second pipe 52. Under this condition, the optical fiber 8 is fixed to the second pipe 52 by a soldering material having a relatively low melting point. A clearance between the optical fiber 8 and the second pipe 52 is sealed by the soldering material used for the fixation therebetween. As the soldering material, an eutectic alloy of gold and tin may be used. In this case, the melting point of the soldering material is about 280° C. The center hole 52A of the second pipe 52 on the first end side thereof is tapered at a small angle as shown by reference numeral 52B, whereby the excitation end of the optical fiber 8 is hardly injured in inserting the optical fiber 8 into the center hole 52A of the second pipe 52 from the first end. Further, the center hole 52A of the second pipe 52 on the second end side thereof is tapered at a large angle as shown by reference numeral 52C, thereby increasing a contact area of the soldering material with the second pipe 52. To improve the wettability of the soldering material to the second pipe 52 and the optical fiber 8, a metal coating such as a gold film may be formed by vapor deposition or the like on solder portions of the second pipe 52 and the optical fiber 8. The cover 48 of the optical fiber 8 is fixed to the first pipe 50 by an adhesive or the like. An air tightness of this ferrule as a single body was tested to prove that a sufficient air tightness of $1 \times 10^{-9}$ atm·cm$^3$/sec or less was obtained.

In applying the ferrule 10' shown in FIG. 18 to the optical module shown in FIG. 3, the first pipe 50 is first fixed to the main ring 6 at plural points by laser welding according to the method shown in FIG. 7B. Then, the laser beam is directed to a clearance between the first pipe 50 and the main ring 6 over the circumference, thereby sealing the clearance between the first pipe 50 and the main ring 6 by laser welding. Similarly, a clearance between the main ring 6 and the housing 4 is also sealed by laser welding. By the application of the ferrule 10' to the optical module shown in FIG. 3 by using such a sealing method, it is possible to provide an optical module having a high mechanical strength, suitable for a reduction in size, and effecting hermetic seal. An air tightness of this optical module was tested to prove that a sufficient air tightness of $1 \times 10^{-9}$ atm·cm$^3$/sec or less was obtained.

Figure 19:
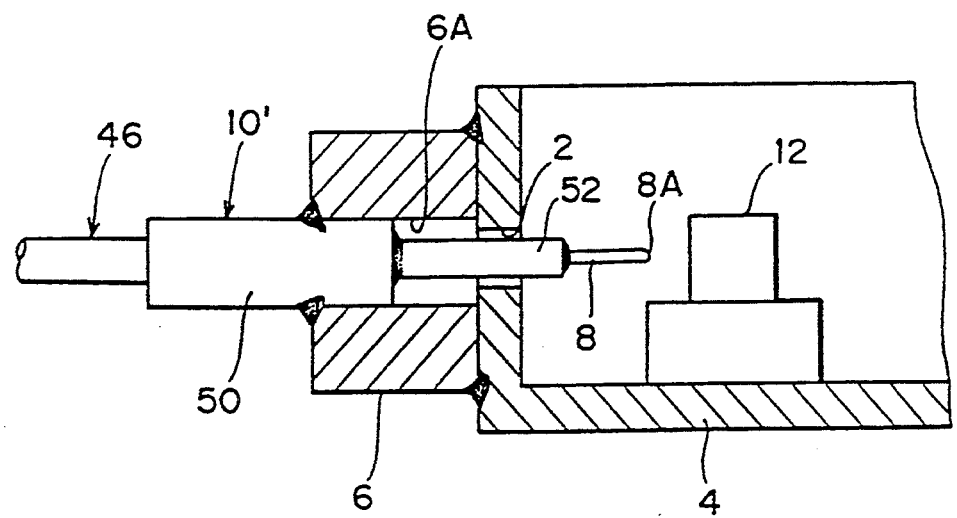
FIG. 19 is a sectional view of an optical module employing the ferrule shown in FIG. 18.

The ferrule 10' shown in FIG. 18 is also applicable to an optical module having no reinforcement ring. FIG. 19 is a sectional view showing a preferred embodiment of an optical module provided with the ferrule 10' shown in FIG. 18. A ring 6 having a center hole 6A is fixed to the housing 4 under the condition where the end surface of the ring 6 is in close contact with the outer side surface of the housing 4. The ferrule 10' is fixed to the ring 6 under the condition where it is inserted in the center hole 6A of the ring 6. A clearance between the housing 4 and the ring 6 and a clearance between the ring 6 and the first pipe 50 are sealed by laser welding. In this preferred embodiment, it is sufficient that the diameter of the opening 2 of the housing 4 is to be slightly larger than the outer diameter of the second pipe 52. Accordingly, a thin structure and a hermetic sealing structure of the optical module can be realized as compared with the construction that a ferrule having a uniform outer diameter is inserted through the opening 2 of the housing 4. As to the thin structure of the optical module, the minimum thickness of the optical module becomes 6.5 mm in setting the outer diameter of the second pipe 52 to 0.8 mm, each of the upper and lower clearances between the second pipe 52 and the opening 2 to 0.5 mm, the wall thickness of the ring 6 to 1 mm, each of the upper and lower laser weld lengths necessary for the fixation of the ring 6 and the housing 4 to 1 mm, and the thickness of a lid of a package (not shown) to 0.7 mm. As to a resonance frequency of vibration of the lowest order in the optical module, the resonance frequency can be increased in this preferred embodiment because a free end portion of the optical fiber 8 is supported by the second pipe 52 having a rigidity greatly larger than that of the optical fiber 8 as compared with the construction that a portion of the optical fiber 8 having a length corresponding to the sum of the length of the projecting portion of the second pipe 52 and the length of the free end portion of the optical fiber 8 is projected directly from the first pipe 50. Further, since the ferrule 10' has a composite structure consisting of the first pipe 50 made of metal and the second pipe 52 made of ceramic, heat insulation of the ferrule 10' is improved. Accordingly, in performing the laser welding of the first pipe 50 and the ring 6, there is no possibility that the soldered portion between the optical fiber 8 and the second pipe 52 may be re-molten by the heat generated by the laser welding. Further, since the amount of the soldering material sealing the clearance between the optical fiber 8 and the second pipe 52 is small, creep is hard to occur in the soldering material as compared with the construction that the optical fiber 8 is soldered directly to the opening 2 of the housing 4 to effect the sealing. Accordingly, the optical coupling efficiency between the optical fiber 8 and the optical device 12 can be stabilized for a long period of time.

Figure 20:
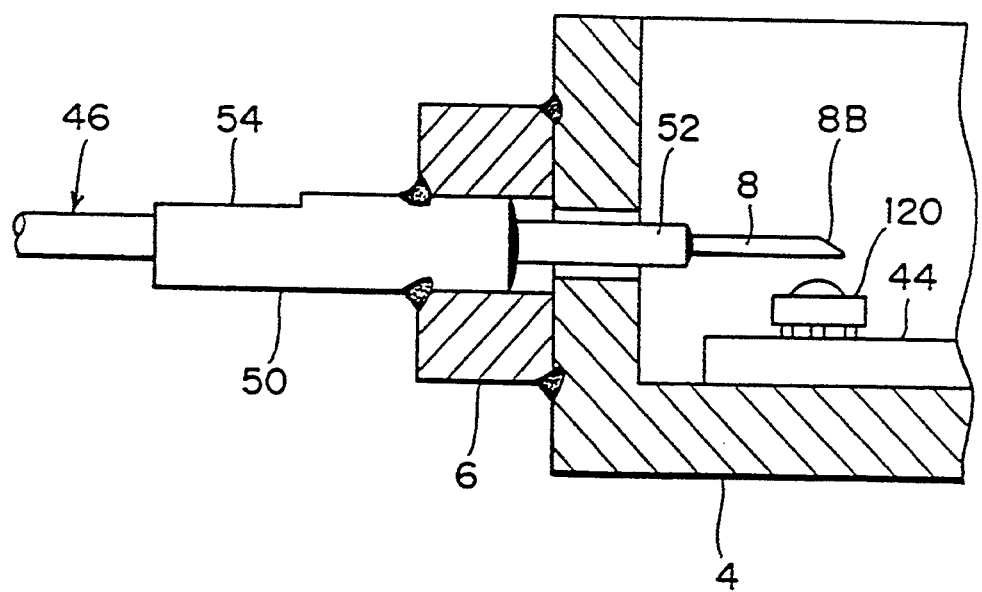
FIG. 20 is a sectional view of another optical module employing the ferrule shown in FIG. 18.

As shown in FIG. 20, an optical fiber 8 having an inclined end surface 8B polished may be optically coupled with the light receiving element 120 of the back surface incident type shown in FIG. 17 by utilizing the ferrule 10' shown in FIG. 18. In this case, it would be necessary to adjust a rotational position of the optical fiber 8. However, according to this preferred embodiment, the first pipe 50 is formed with a flat cut surface 54 as shown in FIG. 20, and a positional relationship between the flat cut surface 54 and the direction of a normal to the end surface 8B of the optical fiber 8 is preliminarily defined, thus eliminating the necessity of adjustment of the rotational position of the optical fiber 8. Further, the light receiving element 120 of the back surface incident type may be replaced by a light emitting element of a surface light emitting type to be optically coupled with the optical fiber 8.

INDUSTRIAL APPLICABILITY

The optical module of the present invention as described above is useful as an optical transmitter, an optical receiver, an optical switching device, an optical modulator, and other optical modules using an optical fiber for a signal interface.

I claim:

1. An optical module comprising:
   a housing (4) having an opening (2) extending from an outer side to an inner side of said housing (4) and having an outer surface around said opening (2);
   a main ring (16) having a substantially central hole (16A) and fixed to said housing (4) so that an end surface of said main ring (16) is in close contact with said outer surface of said housing (4);
   a ferrule fixed to said main ring (16) under a condition where said ferrule is inserted in said substantially central hole (16A) of said main ring (16);
   an optical fiber (8) fixed to said ferrule under a condition where said optical fiber (8) is inserted in a center hole of said ferrule;
   a reinforcement ring (18) fixed to said main ring (16) and said ferrule so as to cover said ferrule in juxtaposed relationship to said main ring (16), a fixing point between said reinforcement ring (18) and said main ring (16) being positioned outside of a fixing point between said reinforcement ring (18) and said ferrule; and
   an optical device provided in said housing (4) and adapted to be optically coupled with said optical fiber (8).

2. An optical module according to claim 1, wherein said ferrule is cylindrical in shape, and inner diameters of said main ring (16) and said reinforcement ring (18) are substantially equal to an outer diameter of said ferrule.

3. An optical module according to claim 1, wherein said optical device is selected from a photo-electric conversion element, an electric-photo conversion element, and an optical wave-guide chip.

4. An optical module according to claim 1, wherein said optical fiber (8) is fixed to said ferrule so that an end portion of said optical fiber (8) projects through said opening (2) of said housing (4) into said housing (4), said end portion of said optical fiber (8) having a tapering, spherical end such that a diameter of said optical fiber (8) at said end continuously decreases toward a tip of said end and a portion near said tip is substantially semispherical, said optical device being located on a geometrical center line of said optical fiber (8).

5. An optical module according to claim 1, wherein said optical fiber (8) is fixed to said ferrule so that an end portion of said optical fiber (8) projects through said opening (2) of said housing (4) into said housing (4), said end portion of said optical fiber (8) having an end surface inclined with respect to a surface perpendicular to a geometrical center line of said optical fiber (8), said optical device being located on an optical path of light reflecting from said end surface of said optical fiber (8).

6. An optical module according to claim 5, wherein said optical device comprises a light receiving element (120) of a back surface incident type having an electrode surface and a lens integrally provided on another surface opposite to said electrode surface, said light receiving element (120) being mounted by flip chip bonding to a conductor pattern on a printed circuit board (44) accommodated in said housing (4).

7. An optical module according to claim 1, wherein said optical fiber (8) is fixed to said ferrule so that an end portion of said optical fiber (8) is located in said ferrule, said optical module further comprising a lens provided in said ferrule so as to be opposed to said end portion of said optical fiber (8).

8. A manufacturing method for an optical module, comprising:
   the first step of inserting a ferrule having a center hole in which an optical fiber (8) is inserted and fixed, into a substantially central hole (16A) of a main ring (16), bringing an end surface of said main ring (16) into close contact with an outer surface of a housing (4) around an opening (2) extending from an outer side to an inner side of said housing (4), and adjusting a relative positional relationship between said ferrule and said main ring (16) and a relative positional relationship between said main ring (16) and said housing (4) under a condition where said ferrule is inserted in said substantially central hole (16A) of said main ring (16) and said end surface of said main ring (16) is in close contact with said outer surface of said housing (4);
   the second step of fixing said ferrule to said main ring (16) and fixing said main ring (16) to said housing (4); and
   the third step of fixing a reinforcement ring (18) to said ferrule and said main ring (16) so that said reinforcement ring (18) covers said ferrule in juxtaposed relationship to said main ring (16), a fixing point between said reinforcement ring (18) and said main ring (16) being positioned outside of a fixing point between said ferrule and said main ring (16).

9. A manufacturing method according to claim 8, wherein adjustment of said relative positional relationships in said first step is effected by measuring an optical coupling efficiency between said optical fiber (8) and an optical device provided in said housing (4), and obtaining a maximum value of said optical coupling efficiency measured.

10. A manufacturing method according to claim 8, wherein fixation of said ferrule to said main ring (16) in said second step, fixation of said main ring (16) to said housing (4) in said second step, and fixation of said reinforcement ring (18) to said ferrule and said main ring (16) in said third step are effected by laser welding.

11. A manufacturing method according to claim 10, wherein:
   a position of irradiation of laser in said laser welding of said ferrule and said main ring (16) comprises a plurality of points lying on an edge of a contact surface between said ferrule and said main ring (16) on an opposite side of said housing (4);
   a position of irradiation of laser in said laser welding of said main ring (16) and said housing (4) comprises a plurality of points lying on an outer circumferential edge of a contact surface between said main ring (16) and said housing (4);
   a position of irradiation of laser in said laser welding of said reinforcement ring (18) and said main ring (16) comprises a plurality of points lying on an outer circumferential edge of a contact surface between said reinforcement ring (18) and said main ring (16); and
   a position of irradiation of laser in said laser welding of said reinforcement ring (18) and said ferrule comprises a plurality of points lying on an edge of a contact surface between said reinforcement ring (18) and said ferrule on an opposite side of said housing (4).

12. A manufacturing method according to claim 11, wherein said plurality of points in each laser welding are equally spaced on a circumference.

13. A manufacturing method according to claim 11, wherein said laser welding of said main ring (16) and said housing (4) in said second step is effected under a condition where said main ring (16) is pressed against said housing (4) by a ring-shaped press jig (36, 36') having an end portion formed with a plurality of recesses (40) corresponding to said plurality of points in said laser welding of said ferrule and said main ring (16), said plurality of recesses (40) of said ring-shaped press jig (36, 36') permitting laser beams to pass therethrough in said laser welding of said ferrule and said main ring (16).

14. A manufacturing method according to claim 13, wherein a width and a depth of each recess (40) and an angle of inclination of a bottom surface (40a) of each recess (40) are set according to a shape and an angle of irradiation of each laser beam so that each laser beam is not cut off by said ring-shaped press jig (36, 36') in performing said laser welding of said ferrule and said main ring (16).

15. A manufacturing method according to claim 13, further comprising means provided at another end portion of said ring-shaped press jig (36') on an opposite side of said main ring (16) for temporarily fixing said ferrule to said ring-shaped press jig (36'), wherein movement of said ferrule in a longitudinal direction thereof is limited by said temporarily fixing means in performing said laser welding of said ferrule and said main ring (16).

16. A manufacturing method according to claim 13, wherein said ring-shaped press jig (36, 36') used in said second step is used also as said reinforcement ring (18) in said third step.

17. A manufacturing method according to claim 8, wherein said ferrule comprises a first pipe (50) made of metal and a second pipe (52) made of ceramic, said first pipe (50) being formed with an axial hole (50A) having a diameter slightly larger than an outer diameter of a cover (48) covering said optical fiber (8), said second pipe (52) being formed with an axial hole (52A) as said center hole having a diameter slightly larger than an outer diameter of said optical fiber (8), said second pipe (52) being inserted in said axial hole (50A) of said first pipe (50) so as to project from an end surface of said first pipe (50);
   said manufacturing method further comprising the steps of:
   inserting said second pipe (52) into said axial hole (50A) of said first pipe (50) and sealing a clearance between said first pipe (50) and said second pipe (52) by using a brazing material having a relatively high melting point;
   inserting said optical fiber (8) and said cover (48) into said axial hole (52A) and said axial hole (50A), respectively, and sealing a clearance between said optical fiber (8) and said second pipe (52) by using a soldering material having a relatively low melting point; and
   sealing a clearance between said first pipe (50) and said main ring (16) and a clearance between said main ring (16) and said housing (4) by laser welding.

18. A manufacturing method according to claim 17, wherein a main component of said brazing material comprises silver, and said soldering material comprises an eutectic alloy of gold and tin.

19. An optical module comprising:
   a housing (4) having an opening (2) extending from an outer side to an inner side of said housing (4) and having an outer surface around said opening (2);
   a ring (6) having a substantially central hole (6A) and fixed to said housing (4) so that an end surface of said ring (6) is in close contact with said outer surface of said housing (4);
   a ferrule (10') fixed to said ring (6) under a condition where said ferrule (10') is inserted in said substantially central hole (6A) of said ring (6);
   an optical fiber (8) fixed to said ferrule (10') under a condition where said optical fiber (8) is inserted in a center hole of said ferrule (10'); and
   an optical device provided in said housing (4) and adapted to be optically coupled with said optical fiber (8);
   wherein said ferrule comprises a first pipe (50) made of metal and a second pipe (52) made of ceramic, said first pipe (50) being formed with an axial hole (50A) having a diameter slightly larger than an outer diameter of a cover (48) covering said optical fiber (8), said second pipe (52) being formed with an axial hole (52A) as said center hole having a diameter slightly larger than an outer diameter of said optical fiber (8), said second pipe (52) being inserted in said axial hole (50A) of said first pipe (50) so as to project from an end surface of said first pipe (50).

20. An optical module according to claim 19, wherein:
   a clearance between said first pipe (50) and said second pipe (52) is sealed by a brazing material having a relatively high melting point;
   a clearance between said optical fiber (8) and said second pipe (52) is sealed by a soldering material having a relatively low melting point; and
   a clearance between said first pipe (50) and said ring (6) and a clearance between said ring (6) and said housing (4) are sealed by laser welding.

* * * * *